United States Patent
Cooper

(10) Patent No.: US 12,256,295 B2
(45) Date of Patent: Mar. 18, 2025

(54) FOUNDATION POSITION MEASUREMENT USING ALTIMETERS

(71) Applicant: Tony Cooper, Dallas, TX (US)

(72) Inventor: Tony Cooper, Dallas, TX (US)

( * ) Notice: Subject to any disclaimer, the term of this patent is extended or adjusted under 35 U.S.C. 154(b) by 253 days.

(21) Appl. No.: 17/968,681

(22) Filed: Oct. 18, 2022

(65) Prior Publication Data

US 2023/0040904 A1   Feb. 9, 2023

Related U.S. Application Data

(63) Continuation-in-part of application No. 17/901,753, filed on Sep. 1, 2022, now Pat. No. 11,871,311, which is a continuation of application No. 16/425,522, filed on May 29, 2019, now Pat. No. 11,438,740.

(51) Int. Cl.
| | | |
|---|---|---|
| *H04W 4/38* | (2018.01) | |
| *E02D 33/00* | (2006.01) | |
| *H04W 4/33* | (2018.01) | |

(52) U.S. Cl.
CPC .............. *H04W 4/38* (2018.02); *E02D 33/00* (2013.01); *H04W 4/33* (2018.02)

(58) Field of Classification Search
CPC .......... H04W 4/38; H04W 4/33; E02D 33/00; E02D 35/00; E02D 35/005; E02D 2600/10; G01C 9/04; G01C 9/02; G01C 5/00; G01C 15/14

See application file for complete search history.

(56) References Cited

U.S. PATENT DOCUMENTS

| | | |
|---|---|---|
| 5,325,702 A | 7/1994 | Verstraeten |
| 6,142,710 A | 11/2000 | Holland |
| 7,900,406 B2 | 3/2011 | Wobben |
| 9,644,365 B1 | 5/2017 | DeStafano |
| 2004/0037653 A1 | 2/2004 | Kelso |
| 2006/0021447 A1* | 2/2006 | Hecht ....................... E02D 5/22  73/803 |
| 2013/0008038 A1 | 1/2013 | Nagao |
| 2014/0114567 A1* | 4/2014 | Buchanan ............ G01C 21/005  701/454 |
| 2015/0327010 A1* | 11/2015 | Gottschalk ............. G05B 15/02  455/456.1 |
| 2016/0340856 A1 | 11/2016 | Conner |
| 2018/0100282 A1 | 4/2018 | Vuyk |
| 2018/0343540 A1* | 11/2018 | Zushi ..................... H04B 11/00 |
| 2022/0235532 A1* | 7/2022 | Vuyk, Jr. ................ E02D 33/00 |

* cited by examiner

*Primary Examiner* — Ryan W Sherwin
(74) *Attorney, Agent, or Firm* — Lathrop GPM LLP

(57) ABSTRACT

A method of monitoring a foundation of a building. The method includes placing altimeters at corresponding locations in the building. The method also includes measuring, using the altimeters, corresponding measurements. The method also includes modeling, using the corresponding altitude measurements, a modeled position of the foundation.

17 Claims, 10 Drawing Sheets

FOUNDATION POSITION MEASUREMENT USING ALTIMETERS

RELATED APPLICATIONS

This application is a continuation-in-part application of U.S. application Ser. No. 17/901,753, filed Sep. 1, 2022; which is a continuation application of U.S. Application Ser. No. 16/425,522, filed May 29, 2019; both of which are hereby incorporated by reference in their entireties.

FIELD

The present invention relates to an apparatus and method to detect foundation movement or stability for, in particular, reinforced concrete foundations like concrete pier foundations.

BACKGROUND

In the construction industry, there has been significant effort over time to reduce the impact that soil movement has on the foundation and the edifice that is constructed upon it. Even though foundations have been built for centuries, a foundation that remains flat or stable over long periods of time has been expensive to achieve and eludes most buyers. A home foundation that stays flat or stable forever has eluded many in the industry.

Technologies to repair cracked foundations are well known in the construction industry and offer varying degrees of success and economic viability. The foundation repair industry is common for having employees with little or no knowledge in the field who are conducting the evaluation of the home. There is currently no credible way to determine if a foundation built on soil which is suspected of movement has actually moved relative to its initial "as built" condition. Elevation maps taken of a building can be misleading because the soil changes seasonally and the flooring surfaces rarely remain flat over the useful life span of a building. It is difficult to be certain about the presence or absence of modifications to the structure. This results in seasonal fluctuations in foundation heave or sag that can be hard to separate from a true permanent deformation. Soils of varying properties that are native or brought in during the construction process likewise create a problem that has to be dealt with by the engineer designing the foundation, the company constructing on said soils, the developer who bought the land, the insurance company who may have an insurance policy against foundation movement, and all property owners.

Foundation inspectors and engineers use relative floor elevations to determine if a foundation is failing. This is currently done by using a digital manometer machine (a so-called computer level) that is placed in the middle of the foundation of the home/building. This is then used as the base reference point for the foundation measurements. The digital manometer machine is then placed around the foundation, and the digital manometer machine will register the relative foundation height differences to the center reference point as a negative or positive elevation difference. Most engineers and or inspectors use a negative −1.0 inch or more from the center reference point to determine that the foundation needs piers or adjustments of existing piers if they exist.

This method, as described above of determining that a foundation is failing, is only correct approximately 30 percent of the time. Foundations that are failing almost always have seasonal cycling of the foundation elevation. If an engineer only takes one set of elevations during the wet season a foundation may be level but still unstable and in need of repair.

Additionally, the relative elevations are almost always taken from the center of the foundation of the home. If the center of the foundation of the home/building is not stable or is dynamic, the unstable center of the foundation will cause all the other elevation measurements to be incorrect.

SUMMARY

The one or more embodiments relate to a method of monitoring a foundation of a building. The method includes placing altimeters at corresponding locations in the building. The method also includes measuring, using the altimeters, corresponding measurements. The method also includes modeling, using the corresponding altitude measurements, a modeled position of the foundation.

The one or more embodiments also relate to a method of monitoring a foundation of a building. The method includes placing altimeters at corresponding locations in the building. The method also includes measuring a measurement history of the altimeters by repeatedly performing altitude measurements by the altimeters over a time period. The method also includes calculating, for each of the altimeters, a height history of height differences among the altimeters by repeatedly calculating, over the time period, the height differences among the altimeters. The method also includes modeling, using the height history of the height differences, a modeled movement of the foundation over the time period.

The one or more embodiments also relate to a system for monitoring a position of a foundation of a building. The system includes altimeters disposed at corresponding locations in the building, wherein the altimeters further comprises corresponding wireless transmitters. The system also includes a wireless receiver configured to receive signals from the corresponding wireless transmitters, wherein the signals represent corresponding height measurements for the altimeters. The system also includes a processor configured to model, using the corresponding height measurements for the altimeters, a position of the foundation.

Other aspects of the invention will be apparent from the following description and the appended claims.

BRIEF DESCRIPTION OF DRAWINGS

The invention may be understood by reference to the following description taken in conjunction with the accompanying drawings, in which, like reference numerals identify like elements, and in which.

Like elements in the various figures are denoted by like reference numerals for consistency.

DETAILED DESCRIPTION

The one or more embodiments relate to modeling a foundation of a building using altimeter measurements. By measuring the absolute altitude of a sensor relative to a fixed frame of reference (e.g., sea level, or the position of an orbital satellite), an accurate model of the elevation, shape, and contour of the foundation may be evaluated. When measurements are taken over time, the motion of the foundation also may be modeled.

The model may take the form of a map that shows the elevation measurement of each altimeter. If a sufficient number of altimeters are present (e.g., one altimeter every ten feet, though this number may vary), then a virtual representation of the shape of the foundation may be generated and displayed to a user. In this manner, the user may immediately view the absolute, true shape of the foundation, at least to within the margin of error of the altimeter elevation measurements. When measurements are taken over time, the motion of the foundation may be presented as an animation. A foundation repair engineer can then use the information shown in the animation to better judge where subsidence and upheaval are occurring, in the case that the foundation is not stable. The foundation repair engineer can then determine which foundation repair technique(s) are most appropriate for a given project, and where exactly, with respect to the particular foundation, the foundation repair technique(s) should be applied.

Figure 8:
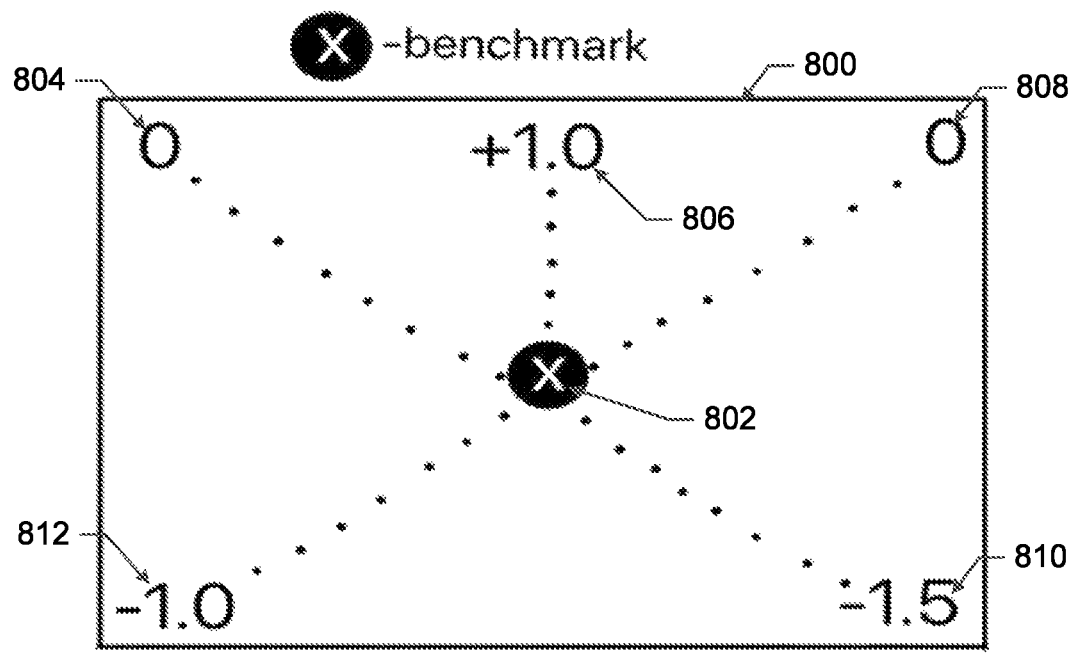
FIG. 8 illustrates a benchmark system of evaluating changes in foundation elevation at various points of a foundation of a building, in accordance with one or more embodiments.

In a different foundation modeling approach, the position of a foundation may be measured relative to a reference measurement. For example, a reference sensor may be placed in the middle of the foundation, or at some other reference location. Other sensors are then placed about the foundation, as shown in FIG. 8. The relative change in elevation of the other sensors, relative to the reference sensor, are then measured.

However, this different foundation modeling approach may result in inaccuracies, as described with respect to FIG. 8. Such inaccuracies may be overcome by using altimeters, which rely on a reference frame that lies outside the foundation (e.g., sea level, an orbital satellite, etc.). Because an outside reference frame is used in the one or more embodiments, each elevation measurement of the foundation is more accurate and the resulting modeling of the foundation position and/or movement over time is more accurate. A more accurate foundation position and/or movement model enables a foundation repair engineer to determine a more accurate, precise, and possibly less expensive foundation repair technique to be applied to a given foundation repair project.

The one or more embodiments thereby use an external reference frame to increase the accuracy of a foundation position and/or movement model. However, the use of an external reference frame may be accomplished using other means.

For example, the present one or more embodiments also positions a transmitter/receiver external to the foundation (a non-foundation location), for example, on a deep driven pier to provide a stable platform in the yard or on a nearby fixed static point to be used as a frame of reference. Thus, the measurements that are received by the transmitter/receiver are independent of movement of the foundation and not biased by the movement of the foundation of the home/building. This transmitter/receiver communicates with transmitters associated with the elevation sensors on the foundation inside the home to determine the movement of the foundation from a fixed/stable reference point rather than a dynamic (moving) reference point. These transmitters/receivers can be linked to central monitoring station such as an application on a phone or a home computer and provide weekly, monthly or yearly foundation elevations and so would be able to also determine with substantially one hundred percent accuracy how much, where, what and in which direction the foundation is shifting. Thus, a relative measurement between the elevation sensor and the transmitter/receiver is avoided and an absolute measurement between the elevation sensor and the transmitter/receiver is achieved.

Figure 1:
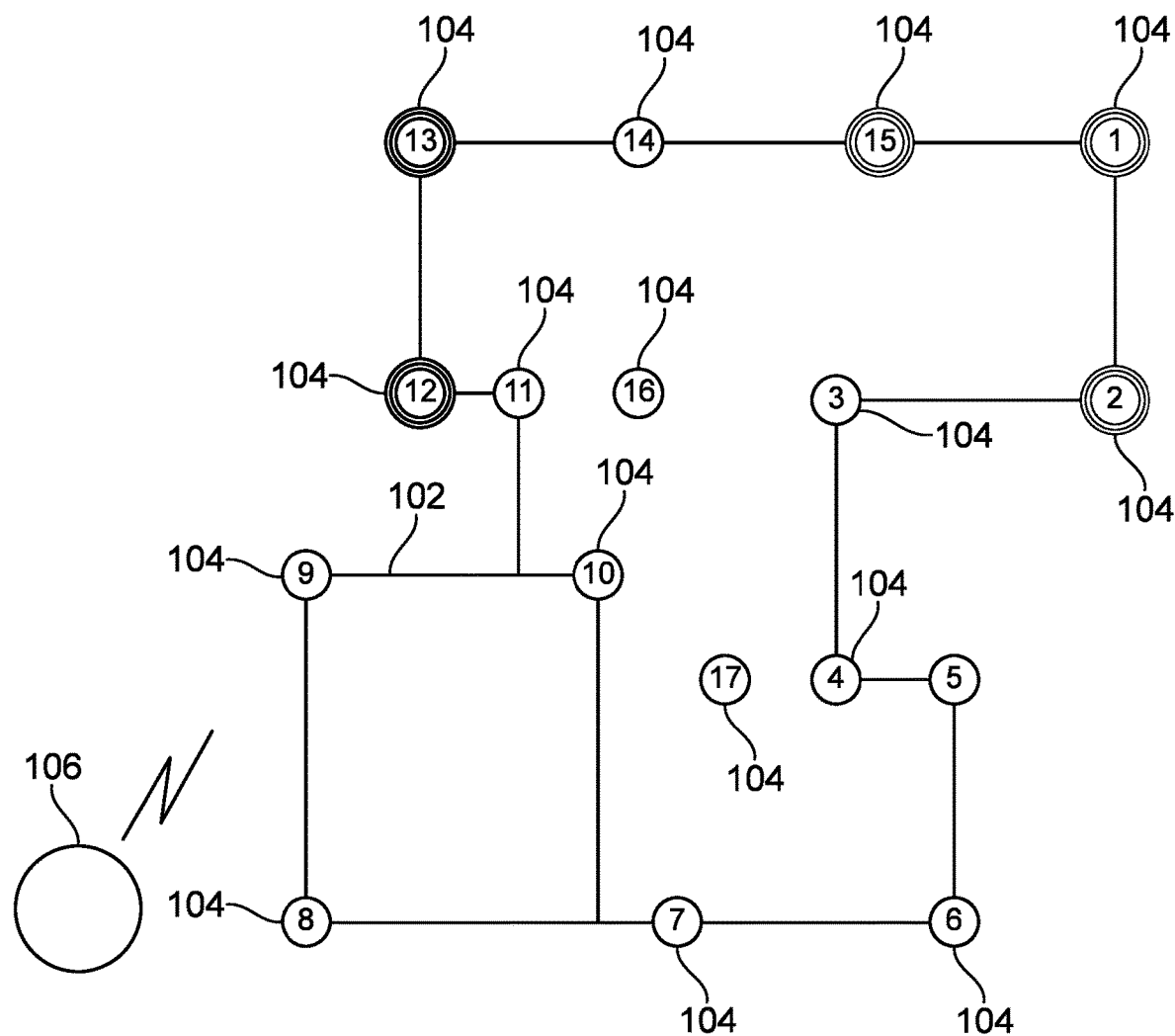
FIG. 1 illustrates a top view of a foundation with sensors mounted.

FIG. 1 illustrates a foundation (102) for a building such as a house or commercial dwelling/building. Furthermore, the foundation (102) may be for a device such as a windmill power generator. While FIG. 1 illustrates a foundation (102) which is substantially a multitude of rectangles, the foundation (102) may include curved surfaces. FIG. 1 additionally illustrates a multitude of elevation sensors (104) which can detect changes in vertical elevation from a predetermined initial position of the sensor (104) to a raised or lowered position of the elevation sensor (104) and to broadcast a signal corresponding to the change in vertical elevation to a central transmitter/receiver (106). The central transmitter/receiver (106) may be external to the foundation (102) and may be positioned at a stable location such as on a deep driven pier to provide a stable platform in the yard or on a nearby fixed static point to be used as a frame of reference. The sensor (104) may be wirelessly connected to the central transmitter/receiver (106) or may be wired or otherwise connected to the central transmitter/receiver (106). The transmitter/receiver (106) is not positioned on the foundation (102) but mounted exterior to the foundation on a deep driven pier to provide a stable platform in the yard or on a nearby fixed static point to be used as a frame of reference. The transmitter/receiver (106) receives the elevation signal from the elevation sensors (104) and sends a second signal to a central monitoring station (120) (see FIG. 7) where the decision may be made to correct the movement of the foundation (102).

The sensors (104) may be positioned at a multitude of positions on the foundation (102). Sensors (104) may be positioned at corners of the foundation (102) as shown as position 1, position 2, position 3, position number 4, position 5, position 6, position 8, position 9, position 10, position 11, position 12, and position 13. However, sensors (104) may be positioned along sides of the foundation as shown as position 14, position 15 and position 7. Furthermore, sensors (104) may be positioned at interior portions of the foundation as shown as position 16 and position 17.

The central transmitter/receiver (106) may be positioned/mounted on a deep driven pier. The pier provides a stable platform in the yard or on a nearby fixed static point to be used as a frame of reference. The central transmitter/receiver (106) receives the broadcast signals from the elevation sensors (104) (an example would be the use of Bluetooth or Wi-Fi or the transmitter/receiver (106) may be directly connected to a cell phone tower) which correspond to the change in elevation of each of the elevation sensors (104). When a signal indicates that the elevation change from the elevation sensors (104) reaches a threshold predetermined value, the transmitter/receiver (106), which may be positioned on a deep driven pier to provide a stable platform in the yard or on a nearby fixed static point to be used as a frame of reference, is activated and transmits a signal to a remote location such as a central station (132) (see FIG. 3). The central station (132) receives wireless signals from the transmitter/receiver (106) to indicate the foundation (102) has shifted and may be in danger of damage to the foundation (102). The transmitter/receiver (106) is not positioned on the foundation (102). Rather, the transmitter/receiver may be positioned external to the foundation (102) which may be on a deep driven pier to provide a stable platform in the yard or on a nearby fixed static point. The fixed static point may be used as a frame of reference in order to eliminate (is independent from) any movement of the transmitter/receiver (106) due to the movement of the foundation (102).

Alternatively, the transmitter/receiver (106) may continuously receive signals from sensors (104). Alternatively, the transmitter/receiver (106) may be activated to interrogate the sensor (104) so that the sensor (104) is activated to transmit a current elevation signal to the transmitter/receiver (106).

Figure 2:
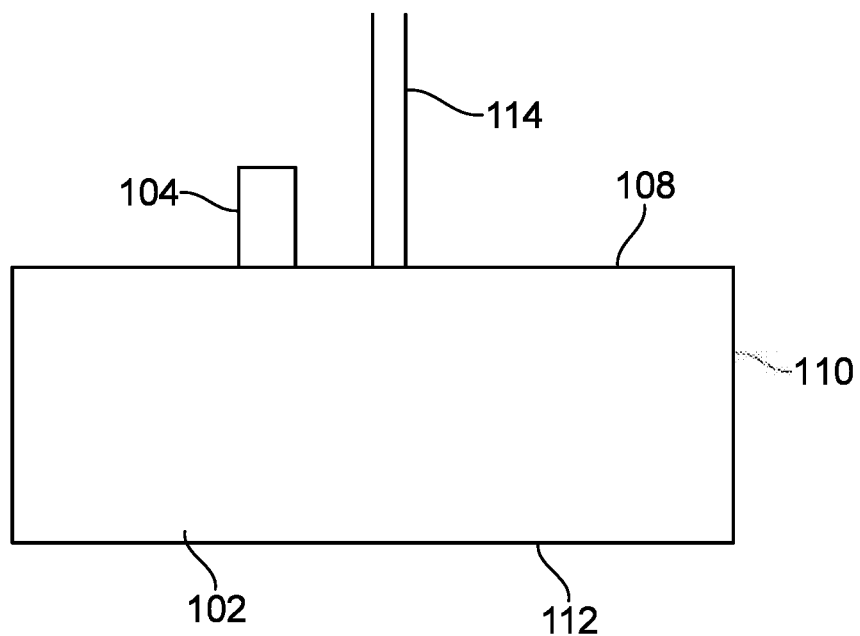
FIG. 2 illustrates a side view of a portion of the foundation and a single sensor mounted.

FIG. 2 illustrates a portion of the foundation (102) which may include a top surface (108) which may be opposed to a bottom surface (112) and which may be connected to a side surface (110). FIG. 2 additionally illustrates an elevation sensor (104) which may be mounted on the top surface (108) and illustrates a building wall (114) which may be an interior wall or an exterior wall.

Figure 3:
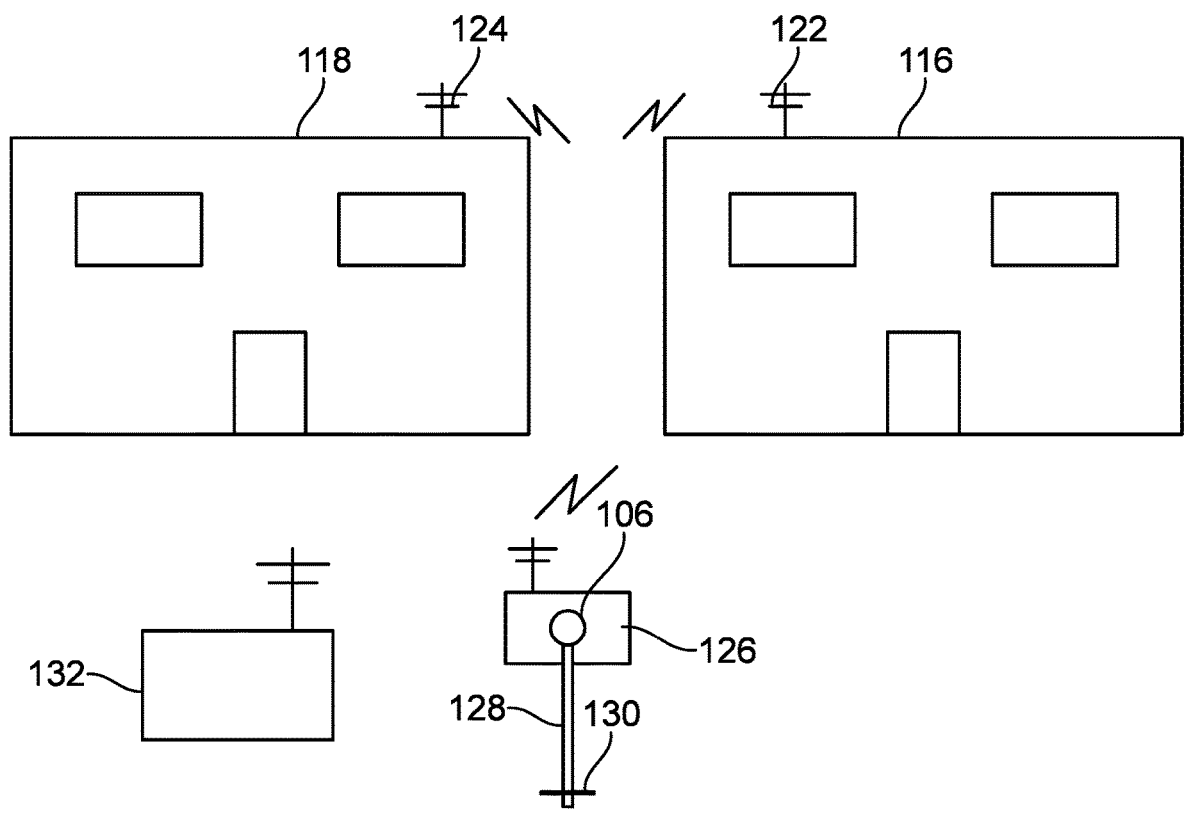
FIG. 3 illustrates a front view of the sensor system of the present invention.

FIG. 3 illustrates a first building (116), a second building (118). The central transmitter/receiver (106) may be positioned on a deep driven pier to provide a stable platform in the yard or on a nearby fixed static point to be used as a frame of reference. The central transmitter/receiver (106) may receive first signals (122) transmitted from the first elevation sensors (104) from the first building (116) and/or the second signals 124 transmitted from the second elevation sensors (104) from the second building (118) either simultaneously or non-simultaneously.

The transmitter/receiver (106) may be positioned in a housing (126). A shaft (128) may mount the housing (126) and may be mounted on a pier (130) which may extend into a substantially unmovable location such as bedrock.

Figure 4:
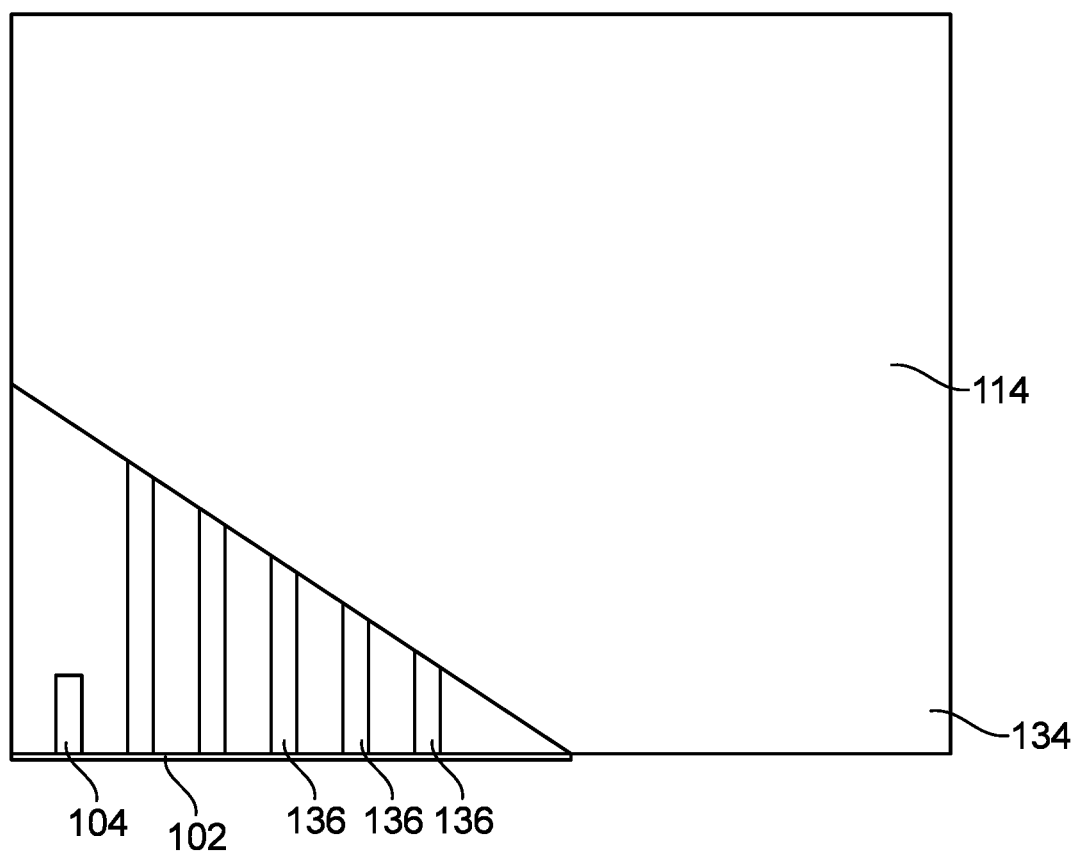
FIG. 4 illustrates a side view of an interior wall of the present invention.

FIG. 4 illustrates an exploded view of a building wall (114) which may be covered with an appropriate material such as wallboard (134) which may be attached to building studs (136) which in turn may be secured to the foundation (102). The elevation sensor (104) may be mounted on the foundation (102) in order to measure changes in the vertical height of the foundation (102).

Figure 5:
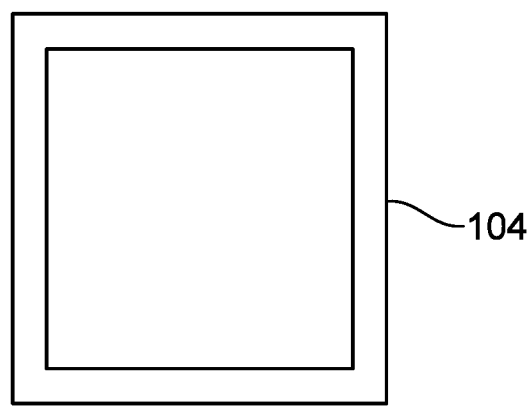
FIG. 5 illustrates a top view of a wireless sensor of the present invention.

FIG. 5 illustrates a top view of the elevation sensor (104). The elevation sensor (104) is positioned independently of the foundation (102).

Figure 6:
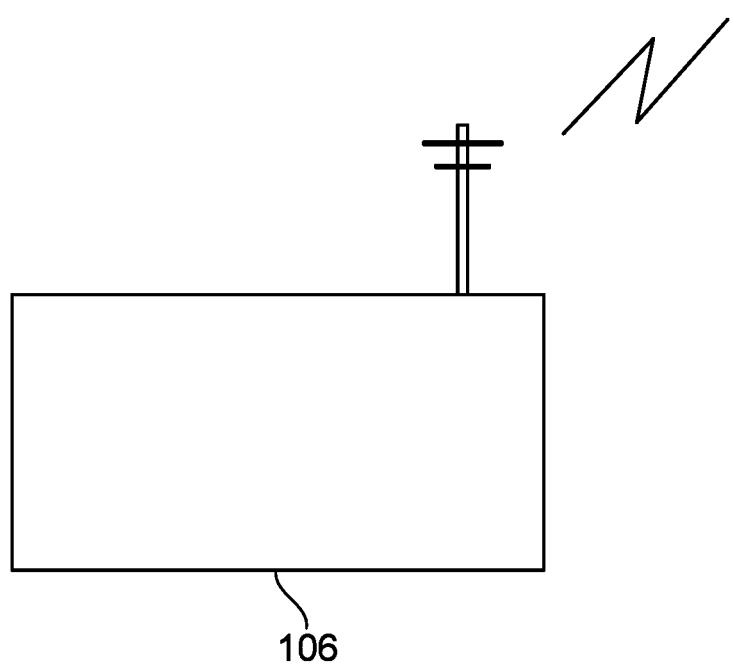
FIG. 6 illustrates a side view of the transmitter/receiver of the present invention.
Figure 7:
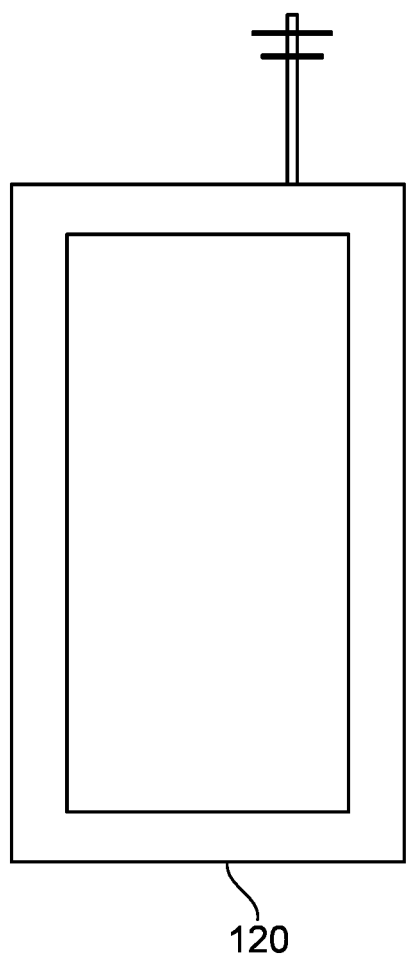
FIG. 7 illustrates a front view of a control device of the present invention.

FIG. 6 illustrates a front view of the transmitter/receiver (106) which may be positioned on a deep driven pier to provide a stable platform in the yard or on a nearby fixed static point to be used as a frame of reference. The transmitter/receiver (106) may receive signals from the elevation sensor (104) and transmit signals to the central monitoring station (120) as shown in FIG. 7. The central monitoring station (120) may be a handheld device such as a smart device, tablet or phone, or may be some other type of computer. The monitoring station (120) may transmit signals to the transmitter/receiver (106) to control the transmitter/receiver (106).

While the one or more embodiments susceptible to various modifications and alternative forms, specific embodiments thereof have been shown by way of example in the drawings and are herein described in detail. It should be understood, however, that the description herein of specific embodiments is not intended to limit the one or more embodiments to the particular forms disclosed.

The one or more embodiments contemplate several examples. The one or more embodiments contemplate an apparatus for monitoring the movement of a foundation. The apparatus includes an elevation sensor to detect changes in elevation of the foundation and positioned on the foundation to broadcast a signal responsive to the movement of the foundation. The apparatus also includes a receiver to receive the signal responsive to the movement of the foundation and positioned off the foundation to provide an absolute measurement of the movement of the foundation.

The one or more embodiments also contemplate an apparatus for monitoring the movement of a foundation, wherein the receiver includes a transmitter to transmit the signal to a central station. The one or more embodiments also contemplate an apparatus for monitoring the movement of a foundation, wherein the central station is a handheld device.

The one or more embodiments also contemplate an apparatus for monitoring the movement of a foundation, wherein the handheld device is a smart phone. The one or more embodiments also contemplate an apparatus for monitoring the movement of a foundation, wherein the handheld device is a tablet.

The one or more embodiments also contemplate an apparatus for monitoring the movement of a foundation, wherein the receiver is wirelessly connected to the elevation sensor. The one or more embodiments also contemplate an apparatus for monitoring the movement of a foundation, wherein the elevation sensor is directly mounted on the foundation.

The one or more embodiments also contemplate an apparatus for monitoring the movement of a foundation, wherein the elevation sensor is mounted at a corner of the foundation. The one or more embodiments also contemplate an apparatus for monitoring the movement of a foundation, wherein the elevation sensor is mounted at a side of the foundation.

The one or more embodiments also contemplate an apparatus for monitoring the movement of a foundation, wherein the elevation sensor is mounted on the interior of the foundation. The one or more embodiments also contemplate an apparatus for monitoring the movement of a foundation, wherein the central monitoring station is wirelessly connected to the receiver.

The one or more embodiments also contemplate an apparatus for monitoring the movement of a foundation. The apparatus may include an elevation sensor to detect changes in elevation of the foundation and positioned on the foundation to broadcast a signal responsive to the movement of the foundation. In this case, the apparatus may also include a receiver to receive the signal responsive to the movement of the foundation and positioned off the foundation to provide an absolute measurement of the movement of the foundation.

FIG. 7 illustrates a central monitoring station usable with the one or more embodiments. The central monitoring station (120) may be located on the stable platform, in the building, or may be disposed remotely from the foundation or building site. A transmitter/receiver (106) may receive signals from the elevation sensor (104), as shown in FIG. 6, and transmit signals to the central monitoring station (120).

As indicated above, the central monitoring station (120) may be a handheld device such as a smart device, tablet or phone, or may be some other type of computer. The monitoring station (120) may transmit signals to the transmitter/receiver (106) to control the transmitter/receiver (106). The central monitoring station (120) may be used by a foundation engineer or technician to make a decision whether, or how, to correct the movement of the foundation (102).

FIG. 8 shows a modeled foundation (800). The modeled foundation (800) is generated using elevation sensors located on the real foundation. The numbers shown in FIG. 8 represent the relative change of an elevation measurement relative to a benchmark sensor, located at a location corresponding to value (802). Thus, each of value (804), value (806), value (808), value (810), and value (812) on the modeled foundation (800) represents the elevation measurement of a corresponding real elevation sensor on the real foundation, relative to the benchmark elevation sensor. The value (802) of the benchmark elevation sensor is always zero, as the benchmark elevation sensor is always level with itself.

Value (804) and value (808) are zero, indicating that the corresponding elevation sensors are at an equal elevation, relative to the benchmark elevation sensor. Value (806) is "+1.0," indicating that the corresponding elevation sensor is one unit higher than the benchmark elevation sensor. Value (810) is "−1.5," indicating that the corresponding elevation sensor is one and a half units lower than the benchmark elevation sensor. Value (812) is "−1.0," indicating that the corresponding elevation sensor is one unit lower than the benchmark elevation sensor.

The units may be any selected units, and the numbers shown are for illustration purposes only. Typical units selected may be millimeters, centimeters, inches, feet, etc.

The modeled foundation (800) may be displayed on a display screen of a computing device (e.g., mobile phone, tablet, laptop, desktop, server, etc.). In an embodiment, the modeled foundation (800) may be converted to a three-dimensional perspective view so that the foundation engineer may assess the overall shape of the foundation. The more elevation sensors that are present (i.e., the space-density of elevation sensors relative to the total area of the foundation), the more accurate the measurement of the shape of the foundation, as more measurements over the area of the foundation mean that smaller variations in foundation shape may be measured and then modeled in a three-dimensional perspective view model. In an embodiment, the modeled foundation (800) may be rotatable when displayed on the computing device, so that the foundation engineer may see the modeled foundation from a variety of different perspectives.

As indicated above, the system and method used to generate the modeled foundation (800) may be prone to uncorrectable errors. For example, the benchmark elevation sensor may, itself, be moving with respect to the Earth as a result of foundation movement. However, the value (802) of the benchmark elevation sensor is always defined as the zero point. As a result, the modeled foundation (800) may be distorted or otherwise an incorrect model of the true shape of the foundation, particularly with respect to the shape of the ground underneath the foundation. Furthermore, the resulting modeled foundation (800) may not track the historical changes of the foundation over time, or may inaccurately record the true changes to the shape of the foundation over time.

Figure 9:
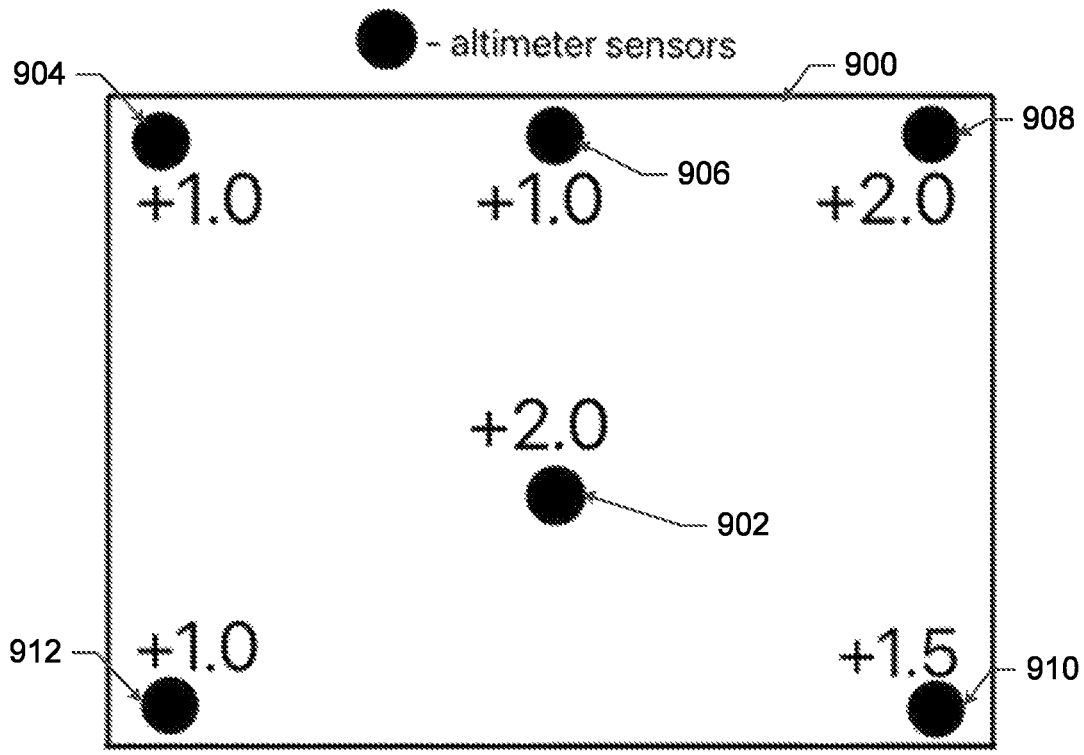
FIG. 9 illustrates a system of using altimeter sensors for evaluating changes in foundation elevation at various points of a foundation of a building, in accordance with one or more embodiments.

FIG. 9 shows an alternative modeled foundation (900). The alternative modeled foundation (900) is similar to the modeled foundation (800). However, each value in FIG. 9 represents a measurement taken by an altimeter located at a corresponding real location on the real foundation. Thus, each of value (902), value (904), value (906), value (908), value (910), and value (912) on the modeled foundation (900) represents the elevation measurement of a corresponding real altimeter on the real foundation, relative to an external reference frame. The value (902) of the corresponding altimeter located in the central region of the foundation may vary, the altimeter measures the height of the sensor relative to an external reference frame.

In the description of the alternative modeled foundation (900), reference is made to "units" and "external reference frame." These terms are now defined.

A "unit" is a pre-determined unit of distance. The unit, for example, may be millimeters, centimeters, inches, feet, etc. The values described with respect to FIG. 9 are for example only, and do not represent any specific values of actual foundation elevation measurements. A unit of distance may be associated with one or more of the three cardinal directions in a Cartesian coordinate system defined with respect to the foundation in question (e.g., length, width, height). However, the unit of distance may be associated with different coordinate systems, such as spherical coordinates (elevation angle, horizontal angle, and distance), geophysical coordinates (latitude, longitude, and altitude), or other coordinate systems. A foundation engineer is capable of selecting an appropriate coordinate system for use with respect to a selected foundation, and may also define a consistent set of units for measurements.

An "external reference frame" is a frame of reference that is independent of the foundation. In an example, the external reference frame is the Earth, using an orbital satellite as the reference position. In this case, the altimeter may be a global positioning satellite (GPS) sensor that measures the latitude, longitude, and altitude of the sensor relative to the satellite. In another example, an "external frame of reference" may be sea-level, with respect to making altitude measurements or vertical distance measurements. In this case, the altimeters may take the form of pressure sensors for determining the altitude of a sensor. Other external frames of reference may be contemplated by a foundation engineer. However, in the one or more embodiments, an "external frame of reference" permits an altimeter to measure the absolute height of the altimeter relative to the external frame of reference. As a result, the height of some or all altimeters placed on the foundation may be determined absolutely.

The term "absolute" means "with respect to the external frame of reference." In other words, the term "absolute" means that any one measurement of the elevation of a point on the foundation is taken with respect to the same external reference frame as the measurements of elevations of other points on the foundation, for which an absolute measurement is desired.

Returning to the example of FIG. 9, value (904), value (906), and value (912) are "+1.0," indicating that the corresponding altimeters are at an equal elevations having elevation values of one unit, relative to the external reference frame. Value (902) and value (908) are "+2.0," indicating that the corresponding altimeters are at equal elevations having elevation values of two units, relative to the external reference frame. Value (910) is "+1.5," indicating that the corresponding altimeter is at an elevation of one and a half units, relative to the external reference frame. The elevation differences between any two altimeters may be evaluated by subtracting one value from the other. For example, the altimeters corresponding to value (904), value (906), and value (912) are 0.5 units lower than the altimeter corresponding to value (910) and are 1.0 units lower than the altimeters corresponding to value (902) and value (908).

The differences in altimeter measurements may be plotted for a virtual, three-dimensional foundation model. Thus, the alternative modeled foundation (900) may be displayed showing an accurate shape of the foundation, relative to an external reference frame. The resulting alternative modeled foundation (900) may be significantly more accurate than the modeled foundation (800) of FIG. 8, because the "true" height (i.e., relative to the external reference frame) is known for all elevation sensors that measure absolute elevations of various points on the foundation.

The accuracy of the measurement of an elevation at any given location on the foundation may be improved using a number of different techniques. For example, two or more altimeters may be placed at or near each selected location on the foundation. The two or more altimeters measure absolute elevation measurements of the location. The two or more altimeter measurements are then combined, and the combined measurement is used as the value of the elevation measurement.

In a specific example, two or three altimeters are placed at a location on a foundation corresponding to value (904). The altimeters each measure slightly different absolute elevation values, some greater than +1.0 units, and some less than +1.0 units. However, when averaged, the combined measurement is +1.0 units. Thus, the combined measurement of +1.0 units is reported as the value (904) for the corresponding location on the foundation.

Other combination schemes may also be used. For example, the foundation may be divided into zones. Each zone includes multiple altimeters. The altimeter in the center of the zone receives a maximum weighting, but altimeters near the edges of the zone may be weighted less. Thus, when the combined altimeter measurement is generated for the zone, the altimeters near the outer edges of the zones contribute less to the ultimate absolute elevation measurement reported for the zone than the central altimeter's measurement.

Many other altimeter measurement combination schemes are possible. Thus, the one or more embodiments are not necessarily limited to the examples provided above.

While FIG. 8 and FIG. 9 show a configuration of components, other configurations may be used without departing from the scope of the invention. For example, various components may be combined to create a single component. As another example, the functionality performed by a single component may be performed by two or more components. More or fewer sensors may be present, and the locations of the sensors may be varied. Thus, the one or more embodiments are not necessarily limited to the examples described with respect to FIG. 8 and FIG. 9.

Figure 10:
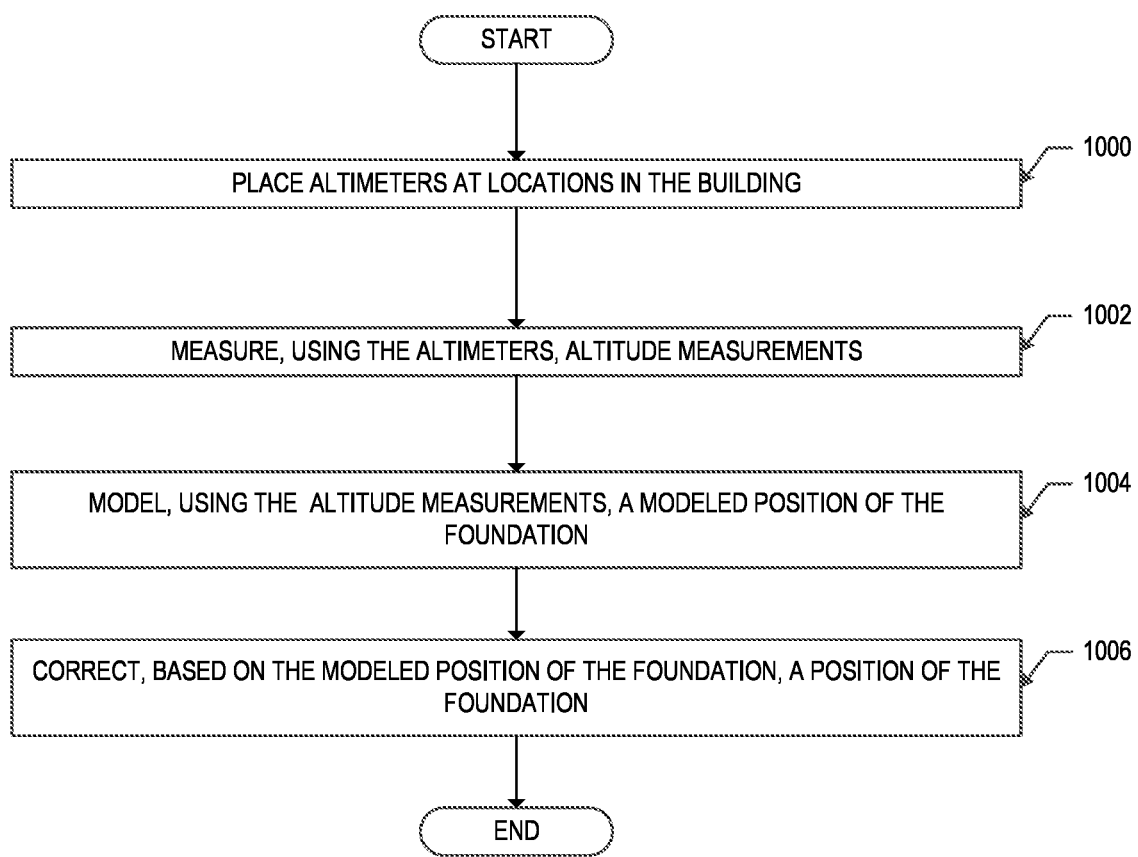
FIG. 10 and FIG. 11 are flowcharts of methods for monitoring a foundation of a building, in accordance with one or more embodiments.
Figure 11:
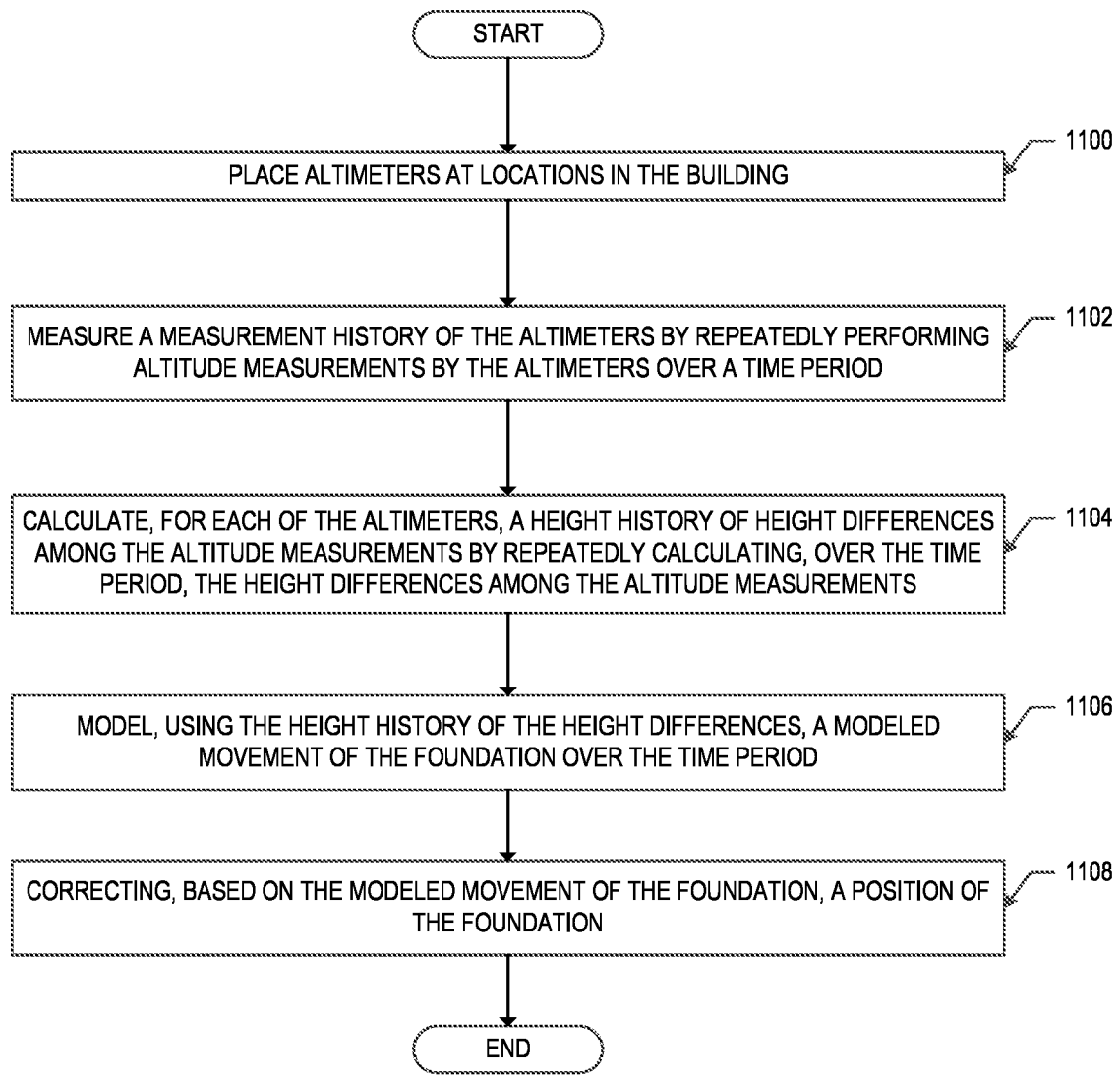

FIG. 10 and FIG. 11 are flowcharts of a method for monitoring a foundation of a building, in accordance with one or more embodiments. The methods of FIG. 10 and FIG. 11 may be performed using the devices described with respect to FIG. 8 and FIG. 9, possibly in concert with the devices and methods described with respect to FIG. 1 through FIG. 7.

Step 1000 includes placing altimeters at corresponding locations in the building. The altimeters may be placed either automatically, or manually by a foundation engineer or technician. The altimeters may be placed in the building (e.g., on floors, walls, or other fixtures of the building), or on the foundation itself. In other words, if an altimeter is placed directly on the foundation itself (as opposed to some part of the building resting on the foundation), then the altimeter is still defined as being placed at a location "in the building" for the purposes of the one or more embodiments.

Altimeters may be placed in a variety of different locations throughout the building. For example, the altimeters may be placed at edges, corners, central regions (within a perimeter of the building), or other places in the building. In an embodiment, multiple altimeters may be set within a pre-determined distance of each other (e.g., within 6 inches) and be treated as being "at the same location" with respect to the building. Some altimeters may be placed on the foundation, and others at other places in the building.

In a specific example, placing the altimeters includes placing a first subset of the plurality of altimeters at each corner of the building or of the foundation, a second subset of the plurality of altimeters along a perimeter of the building or of the foundation, and a third subset of the plurality of altimeters inside the perimeter of the building or of the foundation. However, many other examples are possible.

Step 1002 includes measuring, using the altimeters, altitude measurements. Measuring may be performed by recording altitude measurements at each altimeter, such as by measuring atmospheric pressure (e.g. evaluating pressure relative to sea level under prevailing conditions) or via reference to ground level relative to a satellite system.

Step 1004 includes modeling, using the altitude measurements, a modeled position of the foundation. Modeling may be performed by recording the altitude measurements at each location of the foundation, and then noting the altitude measurements at each of the positions on a corresponding virtual representation of the foundation. The virtual representation may be expressed as a matrix, where foundation coordinates are associated with a corresponding altitude. The virtual representation also may be expressed as a two-dimensional or three-dimensional representation of the foundation which may be displayed on a display device of a computing system (e.g., phone, tablet, laptop, desktop, server, etc.).

For example, modeling may be performed by calculating height differences among the corresponding altitude measurements. Then, a current position of the foundation is modeled using the plurality of height differences. The "position" of the foundation may be a shape of the overall foundation. Thus, modeling the foundation may include generating map of the foundation marked with altitude differences as measured by the altimeters.

Modeling may be performed only with the altitude measurements, and without reference to a benchmark height. A benchmark height, again, is a height measurement of an altimeter or some other sensor which provides a reference height against which other height measurements are compared. Thus, up to all the heights on multiple points on the foundation may be measured with respect to an external frame of reference.

However, it may be possible that modeling is performed with a combination of altitude measurements and benchmarked measurements of foundation position. For example, in an alternative embodiment the absolute height of the foundation is measured at a benchmark location. Thereafter, up to all of the other heights of the foundation may be measured using other types of sensors placed around the foundation. In other words, the benchmark height of one location of the foundation may be measured with respect to an absolute reference frame, but the other heights on the foundation may be measured using the relative reference frame established by the benchmark height. The model is then established as described above.

While the method may terminate at step 1004, the method may include other steps. For example, at step 1006, the method may also include correcting, based on the modeled position of the foundation, a position of the foundation. Correcting may include anchoring the foundation to the Earth to prevent further movement of the foundation. Correcting may include adjusting a position of at least a portion of the foundation, relative to another portion of the foundation. Correcting may include adjusting a position of at least a portion of the foundation, relative to another portion of the foundation, and also anchoring the foundation to the Earth to prevent further movement of the foundation. Many different foundation correction techniques are contemplated, and are not limited to these examples.

The method of FIG. 10 may be varied. For example, the method of FIG. 10 the accuracy of altimeter measurements may be improved by statistical processing. In a specific example, second altimeters are placed at corresponding locations in the building. In other words, the second altimeters are placed within a pre-determined distance of the first set of altimeters. Stated differently, the pairs (or more) of altimeters are placed at each of the locations of the foundation that are to be measured. Then, the method also includes measuring, using the second altimeters, corresponding second altitude measurements. Thereafter, corresponding combined altitude measurements are generated by combining the corresponding altitude measurements with the corresponding second altitude measurements. Then, modeling is further performed using the corresponding combined plurality of altitude measurements.

Combining altitude measurements may take different forms. For example, combining may include averaging corresponding ones of the corresponding altitude measurements with the corresponding second altitude measurements. Thus, variations in the measured altitudes are smoothed out by statistical averaging. In another variation, combining includes using both the corresponding plurality of altitude measurements and the corresponding second plurality of altitude measurements during modeling. In other words, all measurements are used, rather than averages of pairs of heights measured by pairs of altimeters. Many other different combinations are contemplated, such as weighted averaging of measurements, with measurements farther from a selected central selected measurement location receiving less weight than measurements taken at the central selected measurement location. Thus, many different variations are possible.

Attention is now turned to FIG. 11. The method of FIG. 11 is a variation of the method of FIG. 10.

Step 1100 includes placing altimeters at corresponding locations in the building. Placing may be performed as described with respect to step 1000 of FIG. 10.

Step 1102 includes measuring a measurement history of the plurality of altimeters by repeatedly performing altitude measurements by the plurality of altimeters over a time period. Each measurement may be performed as described with respect to step 1002 of FIG. 10. However, the measurements are repeated at each location over a period of time. Thus, a history of measurements are generated. The resulting history may be stored in a database.

Step 1104 includes calculating, for each of the altimeters, a height history of height differences among the measurements by repeatedly calculating, over the time period, the height differences among the altitude measurements. Specifically, the height difference between, for example, the altitude measured at altimeter 1 at time 1, versus the altitude measured at altimeter 1 at time 2. Then, a height difference may be calculated between the altitude of altimeter 1 at time 2 and the altitude of altimeter 1 at time 3. The two height differences may then be stored and tracked. The same altitude differences over time may generated for other altimeters placed in the building. The total collection of height differences is the height history of the foundation.

Step 1106 includes modeling, using the height history of the height differences, a modeled movement of the foundation over the time period. In particular, the height differences can be used to model how the shape of the foundation changes over time. The resulting modeled movement may be expressed as a matrix, and/or may be expressed as an animation of a virtual map of the foundation changing over time, as displayed on a display of a computing device. In this manner, a foundation engineer or technician may quickly assess how a foundation is moving over the course of months, years, or other time periods.

Step 1108 includes correcting, based on the modeled movement of the foundation, a position of the foundation. Correcting the foundation may be performed as described with respect to step 1106 of FIG. 10.

While the various steps in flowchart shown in FIG. 10 and FIG. 11 are presented and described sequentially, at least some of the steps may be executed in different orders, may be combined or omitted, and some of the steps may be performed in parallel. Thus, the one or more embodiments are not necessarily limited to the example provided herein.

The term "about," when used with respect to a physical property that may be measured, refers to an engineering tolerance expected by or determined by one of ordinary skill in the art. The exact quantified degree of an engineering tolerance depends on the product being produced, the process being performed, or the technical property being measured. For a non-limiting example, two angles may be "about congruent" if the values of the two angles are within ten percent of each other. However, if the ordinary artisan determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A could have been separate from component B, but is joined to component B in either a fixed or a removably attached arrangement. In a second meaning, unless otherwise stated, "connected to" means that component A is integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Unless expressly stated otherwise, the term "or" is an inclusive "or" and, as such, includes the term "and." Further, items joined by the term "or" may include any combination of the items with any number of each item, unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method of monitoring a foundation of a building, the method comprising:
    placing a plurality of altimeters at a corresponding plurality of locations in the building;
    measuring, using the plurality of altimeters, a corresponding plurality of altitude measurements;
    modeling, using the corresponding plurality of altitude measurements, a modeled position of the foundation; and
    correcting, based on the modeled position of the foundation, a position of the foundation, wherein correcting comprises anchoring the foundation to the Earth to prevent further movement of the foundation.

2. The method of claim 1, wherein modeling is performed only with the corresponding plurality of altitude measurements, and without reference to a benchmark height.

3. The method of claim 1, wherein modeling comprises:
    calculating a plurality of height differences among the corresponding plurality of altitude measurements; and
    modeling a current position of the foundation using the plurality of height differences.

4. The method of claim 1, wherein the modeled position comprises a map of the foundation marked with a plurality of altitude differences as measured by the plurality of altimeters.

5. The method of claim 1, wherein placing the plurality of altimeters comprises placing the plurality of altimeters directly onto the foundation of the building.

6. The method of claim 1, wherein placing the plurality of altimeters comprises placing the plurality of altimeters at different locations within the building.

7. The method of claim 6, wherein at least some of the plurality of altimeters are placed on parts of the building other than on the foundation.

8. The method of claim 1, wherein placing the plurality of altimeters comprises placing a first altimeter at a corner of the building or of the foundation, and placing a second altimeter within the building or within a perimeter of the foundation.

9. The method of claim 1, wherein placing the plurality of altimeters comprises placing a first subset of the plurality of altimeters at each corner of the building or of the foundation, a second subset of the plurality of altimeters along a perimeter of the building or of the foundation, and a third subset of the plurality of altimeters inside the perimeter of the building or of the foundation.

10. The method of claim 1, wherein correcting further comprises:
    adjusting a position of at least a portion of the foundation, relative to another portion of the foundation.

11. The method of claim 1, wherein correcting further comprises:
    adjusting a position of at least a portion of the foundation, relative to another portion of the foundation; and
    anchoring the foundation to the Earth to prevent further movement of the foundation.

12. The method of claim 1, further comprising:
    placing a second plurality of altimeters at the corresponding plurality of locations in the building;
    measuring, using the second plurality of altimeters, a corresponding second plurality of altitude measurements; and
    generating a corresponding combined plurality of altitude measurements by combining the corresponding plurality of altitude measurements with the corresponding second plurality of altitude measurements,
    wherein modeling is further performed using the corresponding combined plurality of altitude measurements.

13. The method of claim 12, wherein combining comprises averaging corresponding ones of the corresponding plurality of altitude measurements with the corresponding second plurality of altitude measurements.

14. The method of claim 12, wherein combining comprises using both the corresponding plurality of altitude measurements and the corresponding second plurality of altitude measurements during modeling.

15. A method of monitoring a foundation of a building, the method comprising:
    placing a plurality of altimeters at a corresponding plurality of locations in the building;
    measuring a measurement history of the plurality of altimeters by repeatedly performing altitude measurements by the plurality of altimeters over a time period;
    calculating, for each of the plurality of altimeters, a height history of a plurality of height differences among the plurality of altimeters by repeatedly calculating, over the time period, the plurality of height differences among the plurality of altimeters;
    modeling, using the height history of the plurality of height differences, a modeled movement of the foundation over the time period; and
    correcting, based on the modeled movement of the foundation, a position of the foundation, wherein correcting comprises anchoring the foundation to the Earth to prevent further movement of the foundation.

16. A system for monitoring a position of a foundation of a building, the system comprising:
    a plurality of altimeters disposed at a corresponding plurality of locations in the building, wherein the plurality of altimeters further comprises a corresponding plurality of wireless transmitters;

a wireless receiver configured to receive a plurality of signals from the corresponding plurality of wireless transmitters, wherein the plurality of signals represent a plurality of corresponding height measurements for the plurality of altimeters; and a processor configured to:
- model, using the plurality of corresponding height measurements for the plurality of altimeters, a modeled position of the foundation; and
- command to correct, based on the modeled position of the foundation, a position of the foundation, wherein correcting comprises anchoring the foundation to the Earth to prevent further movement of the foundation.

17. The system of claim 16, wherein the processor is further configured to:
- measure, over a time period, a plurality of additional corresponding height measurements for the plurality of altimeters; and
- model, using the plurality of corresponding height measurements and the plurality of additional corresponding height measurements, a modeled movement of the foundation over the time period.

* * * * *